Feb. 23, 1965   G. R. KEENER   3,171,078
SPLIT PHASE FILTER POWER SUPPLY
Filed Feb. 9, 1961
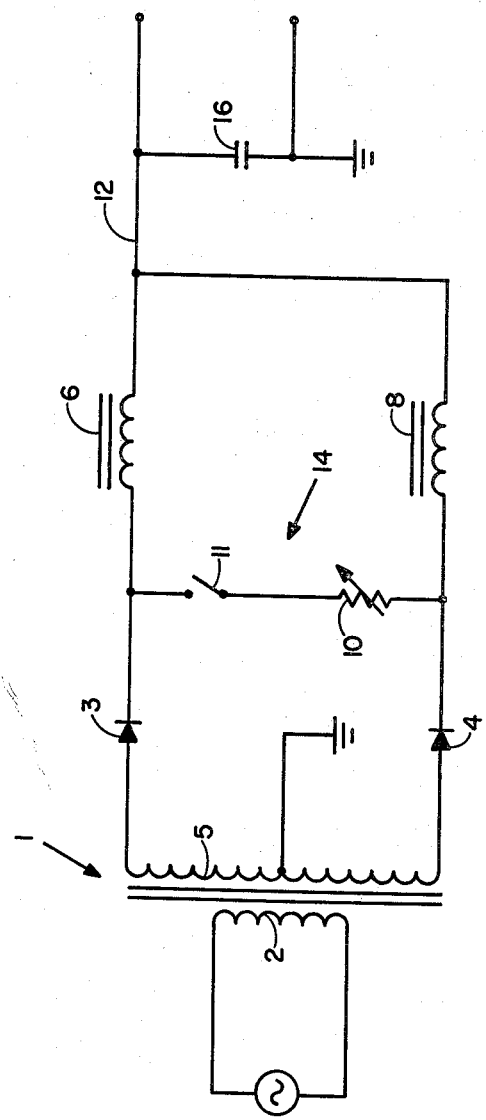
George Robert Keener,
INVENTOR.
BY S. J. Rotondi
A. J. Dupont
Julian W. Dority

United States Patent Office 3,171,078
Patented Feb. 23, 1965

3,171,078
SPLIT PHASE FILTER POWER SUPPLY
George Robert Keener, Star Rte., Laceys Springs, Ala.
Filed Feb. 9, 1961, Ser. No. 88,229
5 Claims. (Cl. 321—9)
(Granted under Title 35, U.S. Code (1952), sec. 266)

The invention described herein may be manufactured and used by or for the Government for governmental purposes without the payment of any royalty thereon.

This invention relates to a converter and more particularly to a power supply which converts an A.C. signal to a low ripple voltage D.C. signal.

In the past when it was desired to vary the output voltage of a half wave choke input filter or a full wave choke input filter, a variable resistor, an amperite voltage regulator, an electron tube, or some other impedance device, was connected in series with the load. These devices operated satisfactorily where the efficiency of the power supply is not critical and where it is not necessary to have a low ripple voltage at the output of the power supply. However, since they are connected in series with the load there is a high $I^2R$ drop produced by the regulating means which cuts down on the efficiency of the power supply.

In view of these facts, an object of this invention is to provide a device for converting an A.C. voltage to a low ripple D.C. voltage.

A further object of the invention is to provide an efficient device for varying the output voltage of an A.C. voltage to a D.C. voltage converter.

The invention will be more readily understood from the following description taken in conjunction with the accompanying drawing, in which the single figure schematically shows one embodiment of my present invention.

This figure shows a power supply transformer 1 having a primary winding 2, which is connected to an A.C. power supply, and a grounded center-tapped secondary winding 5. Opposite ends of the secondary windings are connected to a common output lead 12 via diode rectifier 3 and choke inductor 6 on one side, and diode rectifier 4 and choke inductor 8 on the other side. A regulating device 14, which comprises variable resistor 10 and switch 11, has one end connected between diode 3 and inductor 6 and the other end connected between diode 4 and inductor 8. A capacitor 16 which forms part of the filter section of the converter is connected between the common output lead and ground.

The operation of the device is as follows:

When switch 11 is open and an A.C. signal is applied to the primary winding of the transformer the converter acts in the same manner as two half wave choke input power supplies in parallel and the output D.C. voltage of the converter is of the same value as that produced by a single half wave choke input power supply. However, the output voltage produced by the converter has much less ripple voltage in it than that produced by a single half wave choke input power supply since the signals produced by the two half wave choke input supplies are 180° out of phase.

By connecting the two half wave choke input power supplies to the common output lead behind choke inductors 6 and 8, the operation of the device is similar to that of two D.C. sources connected in parallel and since the D.C. voltages are equal, the value of the output voltage is the same as that of a single D.C. source. This analogy holds true since the choke inductors 6 and 8 convert the pulses produced by rectifiers 3 and 4 to two substantially D.C. signals. When these two substantially D.C. signals are combined a low ripple D.C. voltage is produced, since the upper and lower portions of the converter are balanced and the signals are 180° out of phase. The output voltage would have a value equal to the voltage produced by one of the half wave choke input supplies since the two half wave choke input power supplies are in parallel.

When switch 11 is closed and the variable resistor 10 has been adjusted to provide substantially zero resistance, the converter acts in the same manner as a full wave choke input power supply and the output voltage would have a value substantially greater than that of the converter when switch 11 is open. By varying the value of the variable resistor 10, the output potential can be varied between a maximum limit, which occurs when switch 11 is closed and the variable resistor is set to provide substantially zero resistance, and a minimum limit, which occurs when the variable resistor has a high resistance value or when switch 11 is open. The output potential is varied between these two limits by changing the resistance value of variable resistor 10.

It is to be understood that the form of the invention that is hereinshown and described is the preferred embodiment, and that various changes in the shape, size and arrangement of parts may be resorted to without departing from the spirit of the invention or the scope of the subjoined claims.

The following invention is claimed.

1. A power supply for supplying a low ripple D.C. voltage comprising:
   (a) a transformer having a primary winding and a grounded center-tapped secondary winding;
   (b) a first unidirectional conductive device connecting one end of said secondary winding to a common terminal;
   (c) a second unidirectional conductive device connecting the other end of said secondary winding to said common terminal;
   (d) a first choke means connected between said first unidirectional conductive device and said common terminal;
   (e) a second choke means connected between said second unidirectional conductive device and said common terminal;
   (f) a regulating means for varying the output voltage of said power supply;
   (g) said regulating means having one end connected between said first unidirectional conductive device and said first choke means and having its other end connected between said second unidirectional conductive device and said second coke means; and
   (h) means for taking said output voltage between said common terminal and ground.

2. The device as set forth in claim 1 wherein said regulating means (f) comprises:
   (a) a variable resistor; and
   (b) a switch connected in series with said variable resistor.

3. The device as set forth in claim 2 wherein said first and second choke means are choke inductors.

4. A converter comprising:
   (a) a transformer having a primary winding and a grounded center-tapped secondary winding;
   (b) a first diode having its anode connected to one end of the said secondary winding;
   (c) a second diode having its anode connected to the other end of said secondary winding;
   (d) a first inductance filter having one side connected to the cathode of said first diode and its other side connected to a common terminal;
   (e) a second inductance filter having one side connected to the cathode of said second diode and its other side connected to the common terminal;

(f) a regulating means for varying the output voltage of said converter when said primary winding of said transformer is energized, said regulating means having one end connected between the cathode of said first diode and said first inductance filter and the other end connected between the cathode of said second diode and said second inductance filter;

(g) a capacitor having one side connected to the common terminal and its other side conected to ground; and (h) means for taking said output voltage between said common terminal and ground.

5. The device as set forth in claim 4 wherein said regulating means (f) comprises:

(a) a variable resistor; and (b) a switch connected in series with said variable resistor.

References Cited by the Examiner

UNITED STATES PATENTS

| | | | |
|---|---|---|---|
| 1,997,179 | 4/35 | Logan | 321—24 |
| 2,052,413 | 8/36 | Lord | 321—9 |
| 2,895,059 | 7/59 | Bell | 321—9 |

FOREIGN PATENTS 75,219    9/32    Sweden.

LLOYD McCOLLUM, *Primary Examiner.*

SAMUEL BERNSTEIN, *Examiner.*